United States Patent [19]

Frey et al.

[11] 4,115,786
[45] Sep. 19, 1978

[54] CONSTANT WAVELENGTH MAGNETIC RECORDING

[75] Inventors: Thomas M. Frey, Brighton; Stephen F. Pond, Fairport, both of N.Y.

[73] Assignee: Xerox Corporation, Stamford, Conn.

[21] Appl. No.: 747,284

[22] Filed: Dec. 3, 1976

[51] Int. Cl.² .................. G03G 19/00; G11B 21/02
[52] U.S. Cl. ............................... 346/74.1; 360/70
[58] Field of Search .................. 360/70, 64; 346/74.1, 346/155, 156

[56] References Cited
U.S. PATENT DOCUMENTS

| | | |
|---|---|---|
| 3,401,231 | 9/1968 | Baldwin .................. 360/64 |
| 3,441,687 | 4/1969 | Inoue ..................... 360/70 |
| 3,465,349 | 9/1969 | Schoeneman ............ 360/70 |
| 3,499,997 | 3/1970 | Kosugi .................... 360/64 |
| 4,004,205 | 1/1977 | Yamamoto ............... 360/70 |

Primary Examiner—Jay P. Lucas
Attorney, Agent, or Firm—James J. Ralabate; John E. Beck; George J. Cannon

[57] ABSTRACT

Constant wavelength magnetic imaging is provided by generating a signal having a frequency proportional to the speed of a rotational recording member, multiplying that frequency up to a higher, desired recording frequency, and phase-locking the higher frequency signal to the unmultiplied lower frequency, thus synchronizing the recording frequency with the motor speed.

7 Claims, 4 Drawing Figures

CONSTANT WAVELENGTH MAGNETIC RECORDING

BACKGROUND OF THE INVENTION

This invention relates to magnetic imaging and more particularly to magnetic imaging with a constant wavelength recording independent of speed variations in a rotational recording member.

In magnetic recording systems conventional to audio and visual recording systems, the magnetic signal is recovered by an electronic "reading" head which reconstructs the desired signal into an appropriate audio or visual electronic signal. These conventional systems depend upon recording the magnetic signals on a magnetizable member in "tracks" which are separated from one another by spacings or "guard bands" of the magnetizable member surface bearing no magnetic signal. These "guard bands" are absolutely necessary so that the "reading" head can accurately reconstruct the desired magnetic signal from the "track" that it is reading without being affected by the fringing magnetic fields from adjacent tracks.

In an imaging system wherein the magnetic latent image is desirably rendered visible with magnetic toner, as opposed to the conventional audio and visual magnetic recording systems, the presence of "guard bands" are highly undesirable because magnetic toner is not attracted thereto. This phenomenon is detrimental to visible imaging schemes relying upon magnetic marking materials to develop a magnetic latent image since it leads to streaks or image deletions, especially in solid areas, upon development of the magnetic latent images.

Amplitude modulated recording conventional to audio magnetic recording and disclosed in U.S. Pat. Nos. 3,013,124; 3,479,036 and 3,275,757 are not desirable for visible development of magnetic latent images. This is so because latent magnetic images for visible development are characterized by very high gamma and "grey" scale is difficult to maintain. Accordingly, an amplitude modulated magnetic image would result in loss of good solid area coverage upon development with a magnetic marking material.

The present invention provides an improved magnetic latent image capable of being rendered visible with magnetic marking material and without image deletion. This obviates the need for guard bands by insuring alignment of pixels in the recording tracks thereby eliminating interference between magnetic fields of adjacent tracks. This is accomplished by mounting an optical encoder on the same shaft upon which is mounted a rotating recording member and generating a signal having a frequency less than the desired recording frequency but proportional to the speed of the rotating recording member. This signal is multiplied in a phase-locked loop circuit to the desired recording frequency and maintained in phase with the lower frequency signal by the phase-locked loop circuit.

Phase-locked loop circuits are known. For example, U.S. Pat. No. 3,634,776 employs an apparatus having a photoconductive cell exposed to a light beam modulated at substantially the same frequency as a reference frequency and receiving electric reference signals from a secondary source, for locking the frequency and phase of an output signal to the reference alternating signal. Therein, the output signal frequency is the same as the reference signal frequency. U.S. Pat. No. 3,600,508 is directed to the reduction of capstan speed in a video tape recorder utilizing the multiplication of control track pulses by a large amount to reduce the degree that they may be out-of-phase with each other. This minimizes the phase difference between control track pulses when capstan speed control is switched from control by control pulses to control by the tachometer.

SUMMARY OF THE INVENTION

An object of this invention is to provide an improved latent magnetic image.

Another object of this invention is to eliminate guard bands in latent magnetic images.

A further object of this invention is to insure alignment of recorded tracks in latent mangetic images.

Still, another object of the present invention is to maintain a constant wavelength of recording during variation of revolutionary speed of a rotating recording member.

These objects and others are provided in accordance with the practice of the present invention by utilizing an optical encoder mounted with a rotating disc on the shaft of a rotating recording member for generating a signal having a frequency less than the desired recording frequency but proportional to the rotating recording member rotational speed, multiplying this low frequency signal up to the desired recording frequency, and locking the phase of this higher frequency signal to that of the lower frequency signal.

DETAILED DESCRIPTION OF THE PREFERRED EMBODIMENTS

Figure 1:
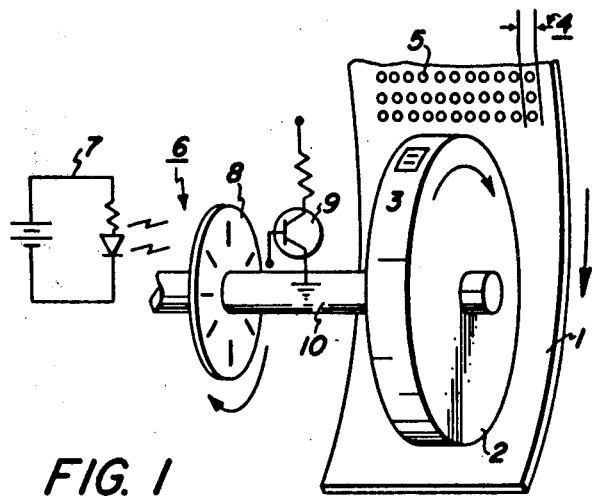
FIG. 1 is a schematic illustration of the optical encoder, disc and rotating recording member used in the present invention.

Referring to FIG. 1, the record head 3 for a direct recording rotating disc 2 is located on the outer circumference thereof. A requirement for synchronization of pixels 5 between recording tracks 4 of a latent magnetic image on a magnetizable recording member 1 is that the wavelength being recorded must remain constant. The wavelength in centimeters is equal to $\pi \, d \, rps$ divided by F, where $d$ and $rps$ are the diameter and revolutions per second of the rotating recording member, respectively and F is a record frequency in Hertz. Hence, a constant ratio between the $rps$ of the disc and the recording frequency must be maintained in order to provide a constant wavelength recording.

The optical encoder 6 comprises stationary light emitting diode 7 mounted within the recording device containing rotating recording member 2 and positioned to direct light upon mask 8. Mask 8 is a disc mounted upon the same shaft as is mounted rotating recording member 2. Mask 8 comprises alternating transparent and opaque portions extending radially along its surface so as to alternatingly transmit and block light from light emitting diode 7. Light transmitted through mask 8 intercepts phototransistor 9 causing voltage and current changes in the collector circuit of the phototransistor. Since each transparent portion of mask 8 is followed by an opaque portion, the light transmitted through mask 8 as it revolves is chopped into pulses or bits of light having a frequency dependent upon the speed of rotation of the shaft upon which it is mounted and the number of transparent and opaque portions on the mask.

Thus, a square wave of light intensity is created to impinge phototransistor 9 and to provide an rps to $f$ ratio ($f$ equal the square wave frequency) which is constant or fixed. The resulting aforementioned voltage and current changes in the collector circuit of phototransistor 9 occur at the same frequency and therefore the optical encoder output signal has a frequency of $f$. In accordance with the practice of the present invention, a phase-locked loop circuit is employed to obtain a desired recording frequency F which is greater in frequency than the optical encoder output signal frequency of $f$. It will be appreciated that since the rps to $f$ ratio is fixed the rps to F ratio is constant, although this latter ratio is of a lower value.

Figure 2:
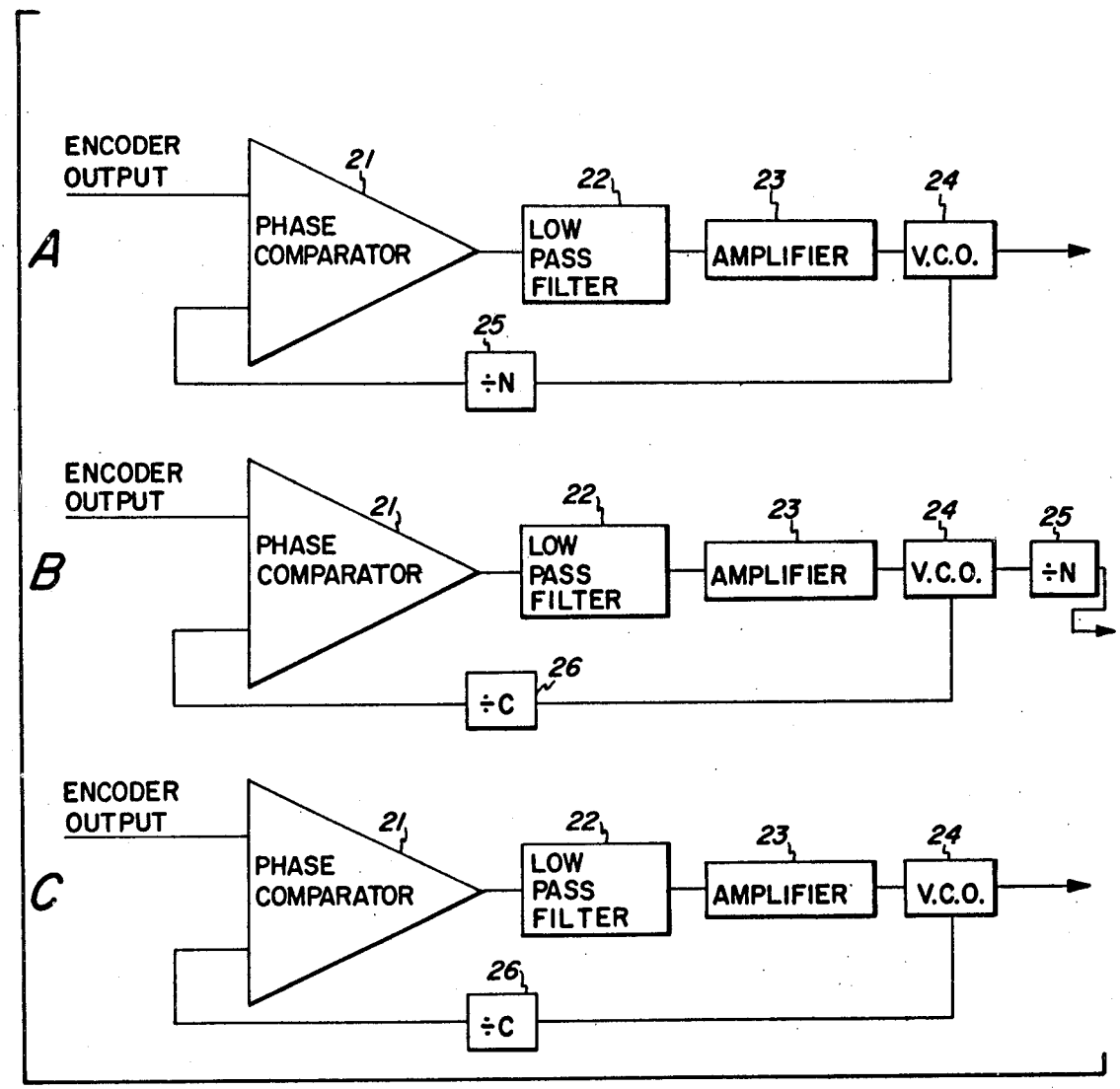
FIG. 2 is an illustrative block diagram for an embodiment of the phase-locked loop circuit utilized in the practice of the present invention.

The output of the phototransistor 9 collector circuit is fed into the phase-locked loop circuit as shown in FIG. 2. FIG. 2 schematically illustrates various embodiments of the phase-locked loop circuit of the present invention.

Figure 4:
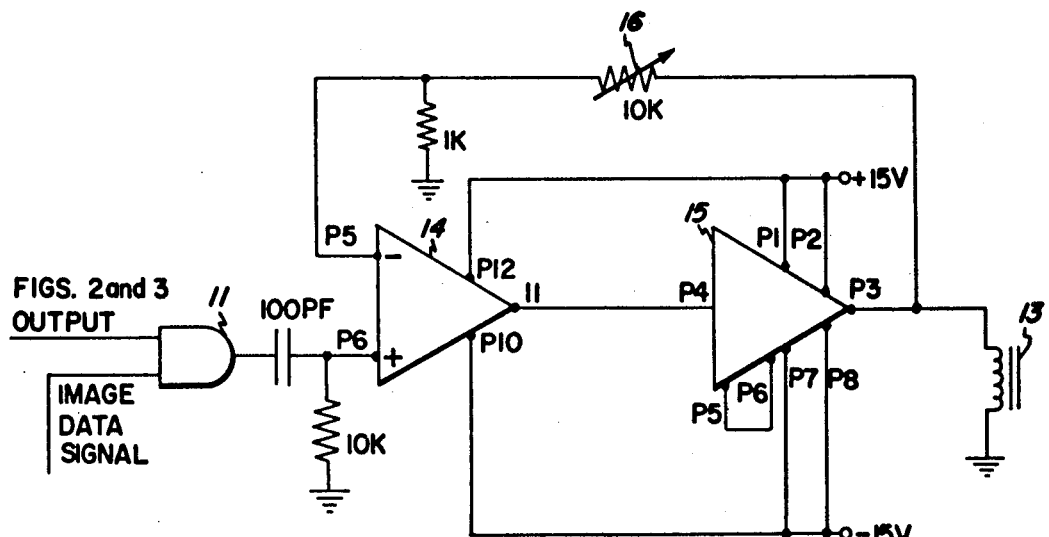
FIG. 4 is an illustrative circuit schematic for an embodiment of a write driver for coupling the output of FIGS. 2 and 3 to a magnetic recording head.

Speaking generally, and referring to the block diagrams in FIG. 2, the phase-locked loop circuit is a feedback system comprised of a phase comparator 21, a low pass filter 22, an error amplifier 23, a voltage controlled oscillator 24, and at least one "divide by" circuit. The input to the phase-locked loop circuit is the output from the optical encoder. The output of the phase-locked loop circuit has a frequency which is a multiple of the input signal from the optical encoder and this output signal serves as a system clock which has the desired recording frequency and is combined with the image data signal through AND gate 11 as shown in FIG. 4.

In operation, the optical encoder output signal, serving as the input signal to the circuit of FIG. 2, is applied to the phase comparator which compares the phase and frequency of the input with the voltage controlled oscillator frequency "divided by" the division circuit. An error voltage is generated by phase comparator 21 that is related to the phase and frequency difference between the two compared signals. This error voltage is passed by low pass filter 22, amplified by error amplifier 23 and applied to the control terminal of the voltage controlled oscillator 24. In this manner, the control voltage forces the voltage controlled oscillator output frequency to vary in a direction that reduces the frequency difference between the two frequencies compared by phase comparator 21. When the two frequencies are sufficiently close, the feedback nature of the phase-locked loop circuit causes the two compared signals to be synchronized or locked. Once in lock, the voltage controlled oscillator output frequency is identical to the input signal except that it is actually running at a multiple of the frequency of the input signal.

The multiplication factor of the phase-locked loop circuit is determined by the ratio required between the system and encoder frequencies in order to obtain any given desired recording wavelength. This ratio can be varied. To obtain this variation, the center frequency of the voltage controlled oscillator 24 is aligned to a new frequency equal to the required system clock frequency by adjusting C1 with no input applied, and the "divide by" circuit is adjusted in the manner later described.

Referring again to FIG. 2, the variations in FIGS. 2A, 2B and 2C illustrate three embodiments of the phase-locked loop circuit that can be utilized in the present invention. When the phase difference between the two signals being compared by phase comparator 21 is a small difference, the circuit of FIG. 2A can be employed to provide adequate locking and the "divide by N" circuit 25 can be selectively varied to vary the value of the constant wavelength recording output of recording head 13 of FIG. 4. When the phase difference between the two phases being compared by phase comparator 21 is too large to provide locking, the "divide by C" circuit of FIG. 2B is employed. This circuit has a fixed, unvariable value in the "divide by" circuit 26. However, the frequency output of voltage controlled oscillator 24 can be selectively varied by the additional "divide by N" circuit 25 to provide a selectively variable value for the constant wavelength of magnetic recording produced by record head 13 of FIG. 4. Moreover, if the "divide by" circuit 25 of FIG. 2B is accessible from the outside of the magnetic recording apparatus (such as switches on a console of a machine) the variation of constant wavelength recording at recording head 13 can be selectively set between different wavelengths which are suitable for different types of reproduction. For example, between text and half toning reproduction. The phase-locked loop circuit of FIG. 2C is one in which the output recording frequency is fixed. The "divide by" circuit 26 is a fixed "divide by" circuit; i.e., it is non-variable. Such a circuit is suitable for use when hard wiring a fixed machine configuration.

Figure 3:
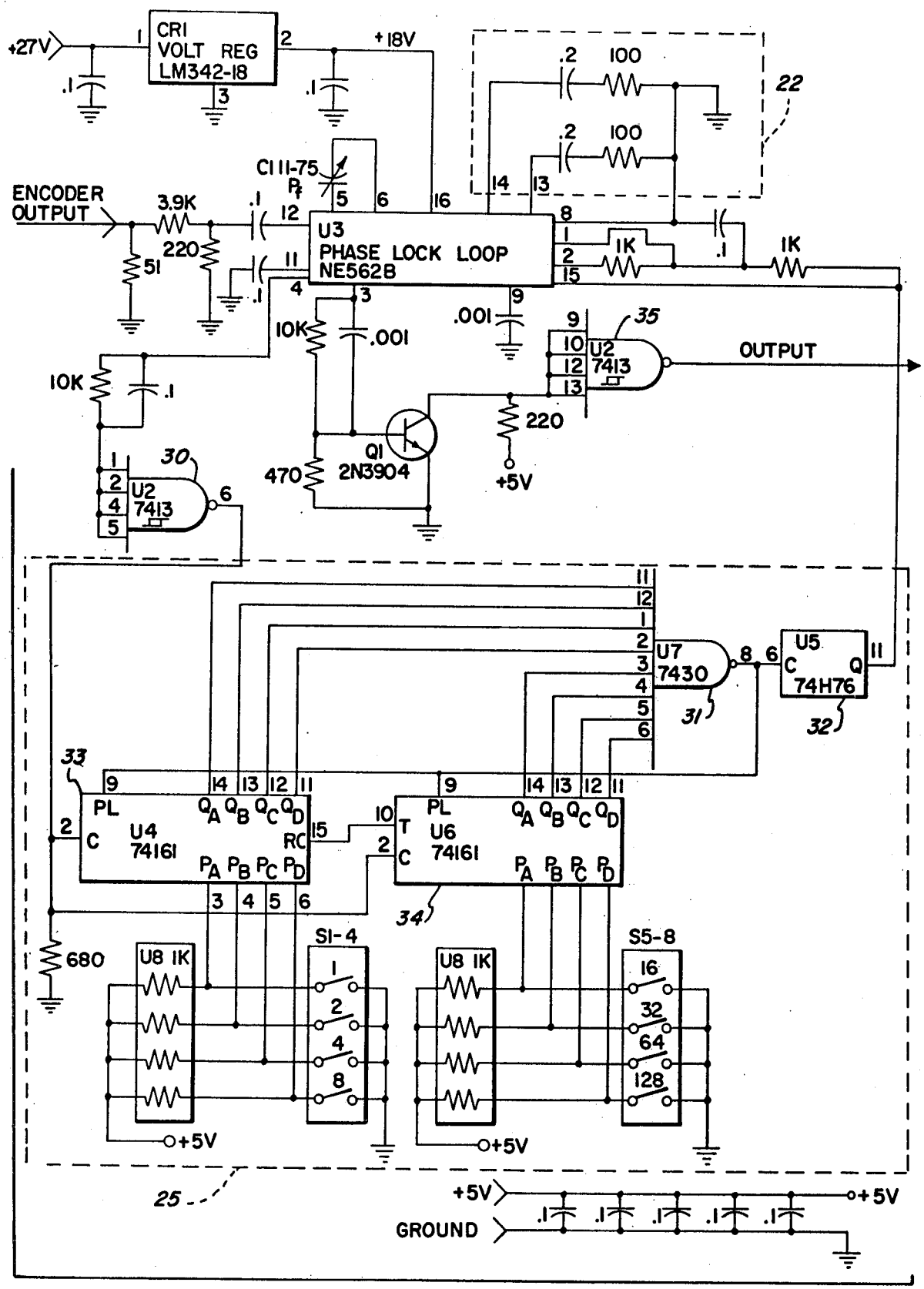
FIG. 3 is an illustrative circuit schematic for the circuit of FIG. 2.

Referring now to FIG. 3, there is seen a schematic of a suitable phase-locked loop circuit for use in the practice of the present invention. This schematic typifies a suitable circuit represented by the block diagram in FIG. 2A. The variable "divide by N" circuit 25 comprises switch selectable counters available from either Texas Instruments or Fairchild Corportion under Item No. 74161. In the circuit of FIG. 3, since there are eight switches the highest count that can be set is 255. Thus, because of flip-flop 32, if a multiplication of two is desired so that the output frequency from the voltage control oscillator is twice the input frequency from the optical encoder, the switches for the counters in the "divide by N" circuit 25 are set at the number 255. The phase-locked loop employed in the schematic circuit of FIG. 3 is an integrated circuit available from Signetics under Items No. NE562B. A Schmitt trigger is employed in the circuit of pin 3 of the phase-locked loop chip in order to provide a preferred, sharp pattern of pulses as the output of the phase-locked loop circuit. All items beginning with the numerals "74" are available either from Texas Instruments or Fairchild Corporation. All capacitances are in micro-farads, unless otherwise noted.

In operation of the circuit in FIG. 3, the optical encoder output is capacitively coupled to pin 12 of the phase-locked loop chip. The output of the voltage control oscillator in the phase locked loop chip appears at pins 3 and 4. The output at pin 4 of the chip is fed into the "divide by N" circuit 25 through Schmitt triggered NAND gate 30. When the "divide by N" circuit counts the number of pulses for which it is set, its output appears at the output pin 8 of the eight input NAND gate 31. The output of NAND gate 31 is fed into pin 6 of the Flip Flop 32. For each two inputs into Flip Flop 32, one output appears at pin 11 of Flip Flop 32. Thus, Flip Flop 32 is effectively a "divide by two" circuit. In operation of the "divide by N" circuit 25, it takes one pulse from output pin 6 of NAND gate 30 to load the number set by switches S1–4 and S5–8 into the counters 33 and 34. Therefore, since the maximum digital number that can be set by the binary switches is 255, the maximum number of pulses that can be counted by counters 33 and 34 is 256 (255 plus the loading pulse). Thus, to obtain any given "divide by" value for the "divide by N" circuit, taking the output of that circuit as pin 11 of Flip Flop 32, the number that needs to be set by the binary switches is equal to 256 − (N/2) wherein N equal the desired multiplication factor of the phase-locked loop circuit, and is also equal to the division factor operating in the "divide by N" circuit. For example, if the number 250 were set by the binary switches into counters 33 and 34, it would take one pulse from pin 6 of NAND gate 30 to load the number into counters 33 and 34 and then take five more pulses for counters 33 and 34 to count up to the maximum number settable by the binary switches which is numeral 255. Thus, a total of six pulses is required into the division circuit 25 to obtain one output at pin 8 of NAND gate 31 which is inputted into pin 6 of Flip Flop 32. However, it takes two inputs into pin 6 of Flip Flop 32 to obtain one output at pin 11 of Flip Flop 32. Therefore, for every twelve pulses at output pin 6 of NAND gate 30 going through the division circuit 25, one pulse is outputted at pin 11 of Flip Flop 32. Thus, the division circuit 25 in FIG. 3 "divides by 12." Since this division factor is also the same as the multiplication factor between the frequency of the output signal of the phase-locked loop and the frequency of the encoder output which is inputted into the phase-locked loop, a convenient formula is expressed by: Set Number = 256 − (N/2). In this formula, N represents the factor by which the "divide by" circuit divides the output of the voltage controlled oscillator in the phase-locked loop chip, as well as the factor by which the frequency of the optical encoder signal is multiplied by the chip through the voltage controlled oscillator.

Remembering now that the output of the voltage controlled oscillator appears at pin 3 as well as at pin 4 of the phase-locked loop chip, the output at pin 11 at Flip Flop 32 is inputted into pin 15 of the chip and, within the chip, is compared to the optical encoder output in phase and frequency. The low pass filter 22 of FIG. 2 is tied into the chip at pins 13 and 14. All frequencies other than the difference frequency between the signal at pin 12 of the chip and the signal at pin 15 of the chip are filtered out and only this difference frequency is allowed to proceed to an amplifier within the chip which generates a voltage (proportional to the difference) termed the "error voltage." This "error voltage" is applied to the voltage controlled oscillator within the chip and drives the oscillator in a direction which tends to bring the value of the frequency difference between the signal at pin 12 of the chip and the signal at pin 15 of the chip to zero. At that point, the two signals at pins 12 and 15 are locked in phase and in frequency. Accordingly, the high frequency output of the voltage controlled oscillator appearing at both pins 3 and 4 are in phase with the optical encoder output signal.

The signal at pin 3 is amplified by Q1 and outputted through Schmitt triggered NAND gate 35. The final output of the phase-locked loop circuit of FIGS. 2 and 3 is taken from pin 8 of NAND gate 35.

Referring now to FIG. 4, it can be seen that the high frequency output of the phase-locked loop circuit (which is a multiple of the optical encoder signal frequency) is combined with image data signal at AND gate 11 and capacitively coupled into a write driver circuit comprising operational amplifier 14 and current amplifying buffer 15. In operation of the write driver circuitry, the output of the write driver is fed to record head 13. Negative feedback of the output of the write driver is fed back to pin P5 of the operational amplifier through trimming potentiometer 16. Trimming potentiometer 16 is adjusted to adjust the overall gain of the write driver. The output of AND gate 11 is fed into pin P6 of operational amplifier 14 through a DC blocking capacitor. The 10K ohm resistor and the 1K ohm form voltage dividers across which voltages are dropped to achieve suitable levels of voltage at pins P6 and P5 of operational amplifier 14. The output of operational amplifier 14 is taken from pin P11 thereof and fed into pin P4 of current amplifying buffer 15. The output of the write driver is taken from pin P3 of current amplifying buffer 15.

Other modifications and ramifications within the spirit of the invention will become apparent during a reading of the present disclosure. These are intended to be within the scope of the present invention.

For example, optical encoder 6 of FIG. 1 need not be limited to the optical transparency mask and phototransistor but can comprise an opaque or transparent disk having light reflection of light from the markings is intercepted by the photosensitive detector (e.g., phototransistor). Furthermore, the encoder need not even be optical but can be magnetic. For example, a disc of non-magnetic material can have markings of magnetic material thereon and the photosensitive detector replaced by a magnetic pick-up, typically a coil in which current is generated by intercepting magnetic fields.

What is claimed is:

1. Variable speed, constant wavelength magnetic imaging apparatus, comprising:
    (a) a rotational recording member having a record head mounted thereon;
    (b) means for generating a first signal at a frequency lower than the desired recording frequency and directly proportional to the rotational speed of said recording member;
    (c) means for generating a second signal at the desired recording frequency which is a multiple of the frequency of said first signal;
    (d) means for maintaining said second signal in phase with said first signal by generating a third signal which is substantially locked in phase and frequency with said first signal and used as a reference signal for locking said second signal in phase with said first signal; and
    (e) means for driving said record head at the frequency of said second signal.

2. The magnetic imaging apparatus of claim 1 wherein said means for generating said first signal at a frequency less that the desired recording frequency and directly proportional to the rotational speed of said recording member comprises an optical encoder.

3. The magnetic imaging apparatus of claim 2 wherein said optical encoder comprises a mask comprising alternate transparent and opaque portions, said mask being mounted on the same rotation shaft as is mounted the rotational recording member; a light emitting diode mounted within said apparatus on one side of said mask and adapted to direct light upon said transparent and opaque portions of said mask; and, a phototransistor mounted on the other side of said mask and adapted to receive light transmitted from said light emitting diode through transparent portions of said mask.

4. The magnetic imaging apparatus of claim 1 wherein said means for generating said second signal at a frequency which is a multiple of the frequency of said first signal comprises a voltage controlled oscillator.

5. The magnetic imaging apparatus of claim 4 wherein said voltage controlled oscillator is controlled by a generated voltage which is proportional in magnitude to the difference between the frequencies of said first and third signals.

6. The magnetic imaging apparatus of claim 5 wherein said third signal is generated by dividing down the frequency of said second signal.

7. Variable speed, fixed wavelength magnetic imaging apparatus, comprising:

(a) a rotational recording member having a record head mounted thereon;
(b) means for generating a first signal at a frequency directly proportional to the rotational speed of said recording member;
(c) means for generating a second signal at a frequency which is a multiple of said frequency of said first signal;
(d) means for maintaining said second and first signals in phase by generating a third signal locked in phase and frequency to said first signal and using said third signal as a reference signal for generating said second signal;
(e) means for operating upon said second signal to produce a fourth signal having a frequency less than the frequency of said second signal; and
(f) means for driving said record head at the frequency of said fourth signal.

* * * * *